Patented Dec. 9, 1941

2,265,127

UNITED STATES PATENT OFFICE 2,265,127

PIGMENT COMPOSITION

Elmer K. Bolton, Wilmington, Del., assignor to E. I. du Pont de Nemours & Company, Wilmington, Del., a corporation of Delaware No Drawing. Application March 9, 1939,
Serial No. 260,865

4 Claims. (Cl. 260—37)

This invention relates to new compositions of matter, and more particularly to new and improved pigment and pigment-like products comprising finely divided colored particles of organic material.

Materials capable of successful use as pigments must be white or colored, insoluble in the common solvents, capable of preparation in finely divided form, and in general non-migrating in the vehicle. These latter criteria restrict the field of operable materials to a relatively small number of colored substances, usually of inorganic origin, and has made it necessary to achieve many of the desired shades by blending the available pigments. Such blending of materials of very different physical properties often leads to undesirable effects. Thus, due to differences in density or particle size, one of the pigments in the mixture may possess a different degree of mobility than the other, and tend to migrate to the surface of the vehicle, causing "flooding."

This invention has as an object the manufacture of new organic pigment materials which overcome the above mentioned characteristics. A further object is the preparation of pigments which, by reason of their high molecular weight are insoluble, and therefore non-bleeding. A still further object is the preparation of a number of variously colored pigments which are otherwise identical in physical properties and can therefore be mixed together without subsequent flooding. Other objects will become apparent as the description proceeds.

These objects are accomplished by the following invention in which a synthetic linear polyamide is prepared in finely divided form and colored by dyeing by the methods more particularly pointed out hereinafter.

The polyamides, which are prepared in finely divided form by the practice of this invention, contain amide groups as an integral part of the main chain of atoms. They are obtainable from polymerizable amino acids and by reaction under suitable conditions of diamines with dicarboxylic acids or amide-forming derivatives of dibasic carboxylic acids. These polyamide-forming reactants are those used in the manufacture of the fiber-forming polyamides described in Patents 2,071,250; 2,071,253; 2,130,523; and 2,130,948. In the preferred practice of the present invention, however, the polyamide-forming reaction is not permitted to reach the fiber-forming or high molecular weight (superpolymeric) stage in as much as such products are generally too tough and elastic to permit economical grinding, and even precipitation from solution by the addition of a non-solvent often tends to give a stringy, cohesive precipitate. The polymers most advantageously used in this invention have molecular weights in the range 500–5000 and are sufficiently friable to permit easy grinding. The intrinsic viscosities of such products are generally below 0.4.

The lower molecular weight polymers which are more readily reduced to finely divided form may be obtained in a number of ways. If a diamine and a dibasic acid are allowed to react in equivalent amounts, the molecular weight of the resulting polymer may be controlled by adjusting the time of reaction, the temperature of reaction, or, more conveniently, by adjusting the amount of water which is present in the reaction vessel. The presence of a small amount of excess water in the reaction vessel, along with the diamine and dicarboxylic acid, represses the polymerization sufficiently to give a polymer of the desired mechanical properties. Polymer prepared in this way may be readily ground to suitable pigment size, and dyed with any number of the common silk and wool dyes.

Another and very convenient method of controlling the molecular weight is by the use of an excess of diamine or dicarboxylic acid, or other monofunctional or difunctional acid or nitrogenous base. Thus, the reaction of 3 mols of diamine with 2 mols of dicarboxylic acid gives a polymer in the desired molecular weight range which contains predominantly amine end groups. Not only is such a polymer satisfactory in its solubility and grinding characteristics, but the relatively large amount of amine end groups present makes acid dyestuffs especially substantive. Likewise, basic dyes are very substantive to a polymer prepared using excess dibasic acid. It is additionally advantageous to have the molecular weight in the range previously mentioned since the chemical properties of the end groups then play an important part in determining the dye affinity of the polymer.

As indicated above, the polyamide may be reduced to finely divided form by grinding or by precipitation. The polymerization reaction, for instance, may be carried out in a solvent such as xylenol and the polyamide precipitated from the solution by the addition of ethyl alcohol or other non-solvent, the mixture further ground if necessary and then dyed. This method can be used to advantage with fiber-forming polyamides which are difficult to grind because they are tough and elastic. If the non-solvent contains a dyestuff in solution, the dispersing and dyeing can be effected in one step.

Another method of obtaining the colored polyamide particles of this invention consists in incorporating a heat-stable dye in the mixture of monomeric polyamide-forming reactants, heating until the desired degree of polymerization is obtained, and grinding the product to the desired size.

The following examples, in which the parts are by weight, are illustrative of the methods used in practicing this invention:

Example I

A mixture of 100 parts of hexamethylene diammonium adipate and 15 parts of water was heated in an autoclave at 218° C. and 250 lbs. pressure for one hour. The polyamide thus obtained was dried at 100° C. for 12 hours. The product was a brittle white powder which was soluble in acids and phenolic solvents. It melted, with previous softening and decomposition, at 220–222° C. Intrinsic viscosity determinations gave a value of 0.28. The product was suspended in an equal volume of water, ground in a ball mill for three days, filtered, dried at 100° C. for 8 hours and ground in a dry ball mill for three days more. The product then consisted essentially of particles not exceeding one micron in size. It was dyed by suspending in a solution of one part of dye of Color Index Number 365 and 2000 parts of water at 60–65° C. for 25 minutes. The dye bath was removed by decantation and the product was washed several times by decantation. The product, which contained 1% by weight of absorbed dye, was a clear light yellow solid entirely suitable for pigment applications.

Example II

A sample of finely divided polyamide prepared as described in Example I was dyed as described in Example I, using dye of Color Index Number 430. The polymer adsorbed 6% by weight of dyestuff before bleeding was observed. The product was dispersed by grinding in blown linseed oil; the dispersion thinned with turpentine was used as a painting composition.

Example III

The preparation was the same as that described in Example I, except that a dye of Color Index Number 289 was used. The product, containing 1% absorbed dye, was a brilliant blue material, entirely suitable for pigment application.

Example IV

Four parts of massive polyamide, prepared as described in the first part of Example I, was dissolved in 34 parts of formic acid. The solution was poured into 300 parts of well stirred water, and the resulting suspension of polyamide was dyed with dye of Color Index Number 289. The product was isolated as a slurry by gravity filtration. The final product was a brilliant blue, and microscopic examination showed that the particle size was very uniform, in the range of 0.5–2 microns.

Example V

A mixture of 489 parts of hexamethylene diammonium adipate and 108 parts of hexamethylene diamine was suspended in 580 parts of m-cresol, and the whole stirred under carbon dioxide and heated at 200° C. for four hours. The solution was then poured into 6000 parts of ethyl acetate, and the resulting flocculent polyamide was extracted several times with boiling ethyl acetate. The material was soluble in acids, phenolic solvents and hot aniline, and slightly soluble in hot alcohols. The substance had an intrinsic viscosity of 0.16, and titration for amine groups with sulfuric acid in cresol indicated a molecular weight of about 1800. It melted with decomposition at 205° C. The substance was ground to the desired particle size, and dyed with dye of Color Index Number 289 in water at 60° C. It was found that it adsorbed 19% of its weight of the dye before bleeding was observed. The substance could be blended with extenders such as barium sulfate.

Example VI

A solution of 232 parts of hexamethylene diamine and 435 parts of adipic acid in 667 parts of p-cresol was heated with stirring under nitrogen at 200° C. for four hours. The solution was then poured into 6000 parts of ethyl acetate, and the resulting precipitate washed several times in boiling ethyl acetate. The product was soluble in acidic and phenolic solvents, and slightly soluble in hot alcohols. It melted at 165° C., had an intrinsic viscosity of 0.12, and titration with sodium hydroxide indicated a molecular weight of about 750. The material was prepared in dispersed form by dissolving in formic acid and pouring the solution into water, and dyed with dye of Color Index Number 430, adsorbing 3–4% of the dye.

Example VII

One hundred and twenty-five parts of high viscosity polyhexamethylene adipamide, having an intrinsic viscosity of 0.81, and a molecular weight of about 13000, was dissolved in 3000 parts of concentrated hydrochloric acid, and the solution was slowly poured into a large excess of well stirred water. The flocculent precipitate was collected by filtration, dried with acetone, and ground to the desired particle size in a ball mill. It was then dyed with dye of Color Index Number 430, adsorbing 1–2% of dye.

Example VIII

A sample of polyglycine, prepared by polymerization of glycine, and having a molecular weight of about 500, was ground to the desired particle size, and dyed with dye of Color Index Number 430, about 2% of the dye being absorbed. The dyeing was uniform light red.

Example IX

A sample of polydecamethylene oxamide, prepared from decamethylene diamine and diphenyl oxalate, and having an intrinsic viscosity of 0.61, was dyed with dye of Color Index Number 430, after having been ground to desired particle size. The polymer adsorbed about 1% of dye.

The polyamide-forming ingredients include any salt or mixture of salts of a diamine with a dibasic acid, or a mixture of such diamines with such acids. As suitable dibasic acids may be mentioned malonic, glutaric, adipic, pimelic, suberic, sebacic, diphenic, and acids and their substituted derivatives such as methyl adipic acid. Also operable are amide-forming derivatives of these acids such as esters, halides, amides and anhydrides. As diamines suitable for use in the invention may be mentioned tetra-, penta-, octa- and decamethylene diamines, as well as substituted derivatives, such as diaminoisopropanol and diethylenetriamine. Furthermore, as polyamide-forming ingredients, there may be used polymerizable amino acids of the type

R—NH—R'—COOH wherein R' is a divalent organic radical and R is a univalent organic radical or hydrogen. As suitable amino acids of this class may be mentioned 6-aminocaproic acid, 7-aminoheptoic acid, 9-aminononanoic acid, 11-aminoundecanoic acid, 17-aminoheptadecanoic acid, 8-aminocaprylic acid, and amide-forming derivatives of such acids, such as the esters, halides, amides, anhydrides and lactams.

The temperature required for polymerization will vary with the reactants used. Temperatures of 150° C.–300° C. are in general satisfactory. Higher temperatures may lead to decomposition. Lower temperatures are often satisfactory, and may even be desirable, if a heat labile dye is incorporated in the reaction mixture. The reaction may be run most conveniently in an autoclave, as this allows control of the molecular weight by controlling the amount of water present in and generated by the reaction mixture at all times. It may, if desired, be conducted at atmospheric pressure, in which case it is necessary to blanket the reaction with nitrogen or some other inert atmosphere to prevent discoloration. Solvents, which are preferably of the phenolic type, as ilustrated by phenol, m-cresol, o-cresol, p-cresol, xylenol, p-butyl phenol, thymol, diphenylolpropane and o-hydroxydiphenyl may be used. If such solvents are used, the polymer can be separated from the solvent by precipitation, i. e., by mixing with a non-solvent for the polymer, such as alcohol, ethyl acetate, or a mixture of the two.

If no viscosity stabilizing agent is used, the time of reaction will control the molecular weight of the product. If the polymer is to be prepared in finely divided form by subsequent precipitation from a solution, the molecular weight may be relatively high, and the heating may be continued for a much longer period. If, however, it is desired to grind the product to pigment size, it will be necessary to control carefully the time of heating. For example, heating hexamethylene diammonium adipate for one hour at 225° C. gives a product of desirable grinding properties, while longer heating may give too tough a product, and shorter heating may give too soluble a product.

As end group modifiers and viscosity stabilizers, there may be used any of the above diamines or dibasic acids, or their amide-forming derivatives. Furthermore, there may be used as viscosity stabilizers monofunctional amide-forming compounds, including their derivatives capable of yielding these compounds or functioning as such under the conditions of the reaction. These monofunctional compounds may be monocarboxylic organic acids or monofunctional nitrogenous bases which contain at least one hydrogen attached to nitrogen. It is preferred, however, to use bifunctional reagents, such as diamines, diacids, ethanolamine, etc., as stabilizing agents, since these materials, as previously indicated, give a polymer containing functional end groups which effect the dyeing properties of the product.

The relative amounts of polymer and dyestuff may be varied as desired. If the polymer is to be colored by dyeing after its formation, the amount of dyestuff which can be absorbed will depend upon the affinity of the polymer for that particular dye. This affinity can be controlled by varying the degree of dispersion of the polymer, i. e., the effective surface of the polymer, as well as the nature and relative amount of the material used as a viscosity stabilizing agent. It is generally not difficult to incorporate 5 to 20% by weight of dye in the polyamide by the process of this invention. However, highly colored products can be secured with amounts of dye as low as 1%.

If the coloring material is incorporated in the polyamide-forming ingredients before polymerization, care must be taken that enough polymer is present to render the coloring material immobile and hence non-bleeding. This will depend in large degree on the specific natures of the polymers and coloring material. Coloring materials capable of direct reaction with the polyamide or its ingredients, or soluble in the polyamide, can be rendered immobile by a relatively small amount of polymer, whereas coloring matter which is rendered immobile simply by occlusion in the polymer particles will require relatively large amounts of polymer.

The dyestuff used in coloring the finely divided polyamide particles may be any of the classes of dyes which are substantive to the massive polyamides. For example, they may be dyes of Color Index Numbers 714 and 640; dyes of the chrome or acid mordant group, e. g., dyes of Color Index Numbers 203 and 720; dyes of the direct or substantive group, e. g., dyes of Color Index Numbers 365 and 512. Other suitable dyes include dyes of Color Index Numbers 234 and 653 (orange), 225 (pink), 176, 419, and 37 (red), 431 (scarlet), 583, 589, 593 (green), 267 (gray), 833 (blue), and 307 (black). Mixtures of such dyes may also be used.

It is especially valuable to incorporate dyestuffs which themselves contain acidic groups or basic nitrogen groups, since such groups permit the dyestuff itself to enter into the polymer-forming reaction, and the substance is then chemically bound in the polymer. Such dyestuffs, if they contain two or more amide-forming groups, may be used to replace part of the diamine or diabasic acid, in which case they occur in the finished product as recurring units in the polyamide chain. If the dyestuff contains only a single amide-forming group, it may serve to replace all or part of the viscosity stabilizing agent mentioned above.

The pigments of this invention may, if desired, be extended on suitable substrates, such as alumina, zinc oxide, barium sulfate, calcium sulfate, talc, and silicates. They can also be mixed with other pigments, e. g., titanium dioxide, Prussian blue, lithopone and zinc sulfite.

The pigment materials prepared in this invention may be used in any of the common pigment applications. Thus, they may be substituted for commonly used pigments in printing inks, lacquers, enamels, and paints. The vehicles commonly employed in such formulations are suitable for use with the pigments of this invention. Such vehicles include natural and synthetic film-forming materials, such as alkyd resins, oil-modified alkyd resins, oleo-resinous compositions in general, pyroxylin lacquers, linseed oil, and other drying oils. The pigments described herein may also be used to pigment massive compositions, such as molded plastics, rubber, etc.

The present invention eliminates the disadvantage in the prior practice of obtaining desired shades by blending materials of different physical properties which often results in flooding through migration of the more mobile or lighter constituents to the surface of the vehicle. Due to the affinity of polyamides for a large number of dyestuffs, the range of color which is open to the pigments of this invention is very broad. Thus, it is seldom necessary to use mixtures of pigments to obtain a desired shade. Furthermore, if mixed pigments are desired, the products of this invention may advantageously be used. Since the bulk of the pigment consists of the polyamide, differences in density and particle size are practically eliminated, the physical properties of variously colored pigments are very similar, and tendency to flooding is greatly reduced.

As many apparently widely different embodiments of this invention may be made without departing from the spirit and scope thereof, it is to be understood that I do not limit myself to the specific embodiments thereof except as defined in the appended claims.

I claim:

1. A pigment composition yielding on dispersion in a liquid film-forming vehicle a colored coating composition, said pigment composition comprising in substantial amount an organic pigment consisting of finely divided synthetic linear polyamide particles colored with a dyestuff, said polyamide being one of molecular weight from about 500 to 5000 and being the reaction product of a polyamide-forming composition comprising reacting material selected from the class consisting of polymerizable monoaminomonocarboxylic acids and mixtures of diamine with dibasic carboxylic acid.

2. The pigment composition set forth in claim 1 in which said polyamide is the reaction product of reactants comprising a mixture of diamine, dibasic carboxylic acid and one of said reactants in excess of the amount required to form said polyamide.

3. The pigment composition set forth in claim 1 in which said dyestuff contains an amide-forming group.

4. A colored coating composition comprising a vehicle having dispersed therein finely divided synthetic linear polyamide particles colored with a dyestuff, said polyamide being one of molecular weight from about 500 to 5000 and being the reaction product of a polyamide-forming composition comprising reacting material selected from the class consisting of polymerizable monoaminomonocarboxylic acids and mixtures of diamine with dibasic carboxylic acid.

ELMER K. BOLTON.